9795X
L. PICKERING AND J. LIGHTNER.
Car Bumper.
Patented June 28, 1836.
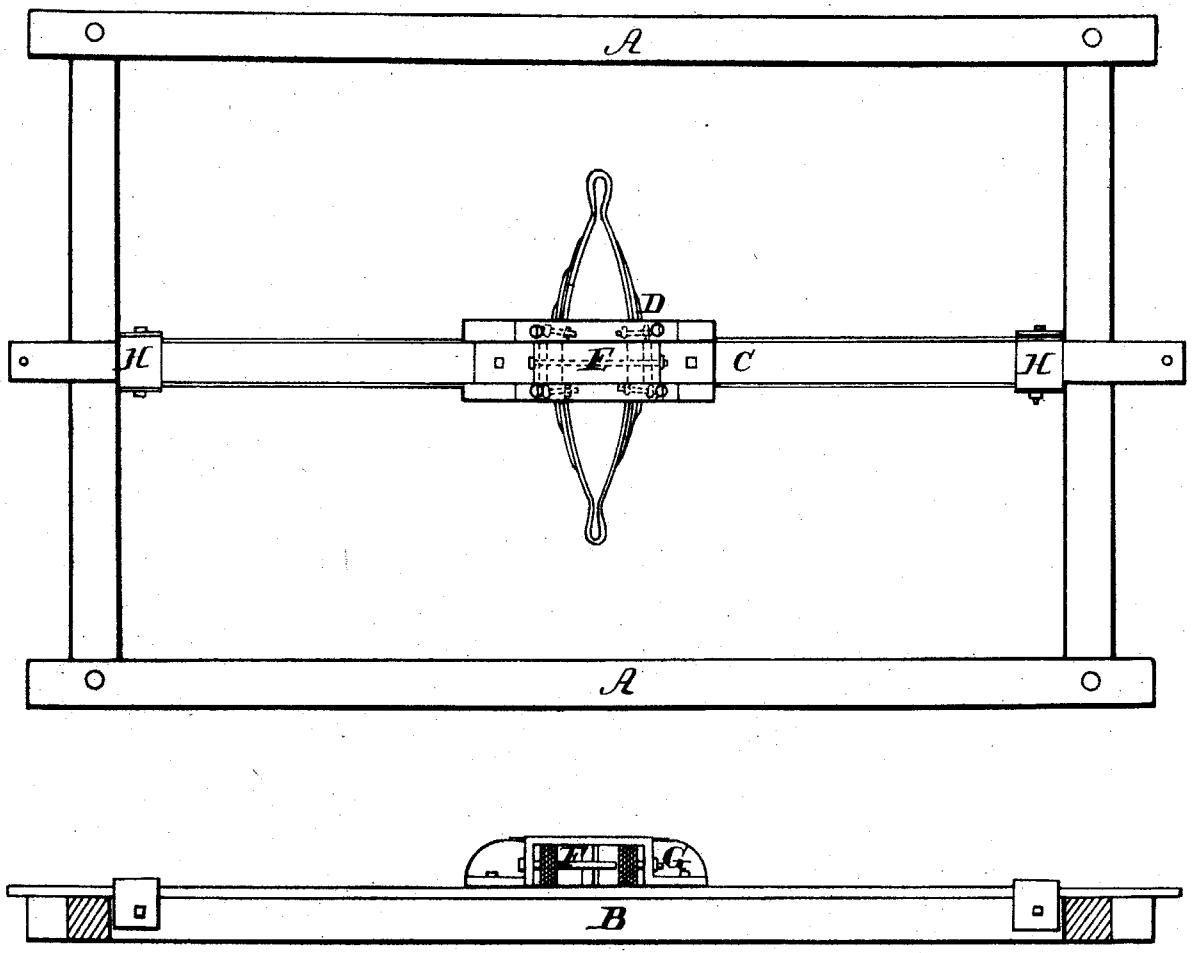
THE NORRIS PETERS CO., PHOTO-LITHO., WASHINGTON, D. C.

Daniel N. Pickering Jr.
and
John Ligtner
Letters Patent

9795X 6-28-1836

The Schedule referred to in these Letters Patent and making part of the same Containing a description in the words of the said Daniel N. Pickering Jr. and John Lightner themselves of their Improvement in the manner of attaching Rail Road Cars to the motive power.

To all people to whom these presents shall come: Daniel N. Pickering Jr. & John Lightner both of Boston County of Suffolk and State of Massachusetts, sends Greeting... Be it known: that we Daniel N. Pickering Jr. & John Lightner have invented, made, constructed and applied to use, a new and usefull improvement in the manner of attaching Rail Road Carrs to the motive power wherein each Carr is attached in the train by a particular spring, which we call the Independent Draw Spring possesing advantages over all other modes of attaching the same: as the Shaft is connected through the whole train by a Stiff coup[l]ing, ena[b]ling the spring to act Independantly on such Carr to which applied either in progress or stoping. The advantages which are perceived at first view over that mode by which the whole train is conneled by one spring that being made very stout and strong is inoperative in most instances. Herewith is forwarded to the Patent Office a model, and two sets of Drawings, by reference to which this specification can be readily understood.

Our Improvement is represented by a frame of wood which represents the Carr to which the axle trees are attached, with a perch through the centre. AA. are the side pieces to which the axle trees are attached; B the perch. C is a Shaft of Iron sufficiently strong to sustain the Train of Carrs, extending the length of one Carr; secured in its place by Clamps made fast to the Perch, in which it is moveable. D is an elliptic 9795X 6-28-1836

Spring of sufficient strength to sustain one Car. E. a clasp passing over
and enclosing the spring and made fast to the Shaft. F. a Bolt through the
centre of the Spring fastned to the side of the clasp, on which the spring
is movable. G. a Box or two seperate pieces of Cast Iron or other materia[illegible]
with an aperture in each side or piece to admit the Spring at its greate[illegible]
tention; secured to the Perch serving for the shaft and Spring to work [illegible]
of sufficient strength for a stop or stay H H are clasps over the Shaft
secured to the perch in which the Shaft moves. We claim as our inven-
-tion the Shaft, the maner it slides on the perch; the Spring attached to
it. We claim as an arangement the clasp and rod that sustains the
Spring, and the Box or sides secured to the Perch, operating as stops [illegible]
in the shaft and Spring work. For which we pray that the exclusive [illegible]
may be secured to us according to law.

In testimony that the foregoing is a true specification of our said impro-
-ment, We have hereunto set our hand this 29 day of April in the year
of our Lord One thousand eight hundred and thirty six Daniel N. Pickering Jr
John Leighner Witnesses
John C. Parks
Alex: Murray.

(Drawing)

Exd. [illegible]

(Rec.d & Recorded anew June 13. 1840.)

[illegible]